United States Patent [19]

Kim

[11] 4,032,279
[45] June 28, 1977

[54] EXTRUSION ADAPTER

[75] Inventor: Heung Tai Kim, Avon Lake, Ohio

[73] Assignee: The B. F. Goodrich Company, Akron, Ohio

[22] Filed: Sept. 8, 1975

[21] Appl. No.: 611,396

[52] U.S. Cl. .......................... 425/382 R; 264/209; 425/464

[51] Int. Cl.² ........................................ B29D 23/04

[58] Field of Search ............ 425/382, 464, 382.2, 425/463, 380, DIG. 206; 264/209, 176 R, 98; 137/561 A, 565

[56] References Cited

UNITED STATES PATENTS

| | | | |
|---|---|---|---|
| 3,262,466 | 7/1966 | Adams et al. | 137/561 A X |
| 3,381,336 | 5/1968 | Wells | 425/382.2 X |
| 3,416,190 | 12/1968 | Mehnert | 425/382 X |
| 3,561,053 | 2/1971 | Pearson | 425/381 X |
| 3,702,226 | 11/1972 | Kim et al. | 425/382 X |
| 3,819,777 | 6/1974 | Vermeerbergen | 425/144 X |

*Primary Examiner*—Francis S. Husar
*Assistant Examiner*—Mark Rosenbaum
*Attorney, Agent, or Firm*—Joseph Januszkiewicz; W. A. Shira, Jr.

[57] ABSTRACT

An adapter apparatus for splitting a single extrudate into a plurality of extrudates wherein an adapter block of the adapter apparatus has at least three planar surfaces with an inlet opening on one planar surface and outlet openings on the other planar surfaces. A single conduit extends from the interior of the block to the inlet opening while a pair of conduits extend from the respective outlet openings and intersect the single conduit. Goosenecks interconnect each outlet opening to die means. All of the openings on the planar surfaces are circles.

6 Claims, 2 Drawing Figures

EXTRUSION ADAPTER

BACKGROUND OF THE INVENTION

This invention relates to an extruder and more particularly to an adapter for a die head of an extruder which splits the melt from the extruder into separate flow paths for movement to separate die heads.

Materials which are plasticized by an extruder such as polyvinyl chloride wherein the solid granular materials are heated and plasticized to issue as cylindrical shaped extrudate is very sensitive to overheating and subject to degradation. The improvement have been principally directed to extruder screw design and die head design to improve the homogeneous viscosity of the melt to assure a smooth flow of the plasticized material. It is also desirable to maintain this smooth flow of material in the die head adapter which splits the main flow from the extruder to into at least a pair of extrudates for extrusion for their respective die heads. The physical properties such as viscosity and velocity of flow are adversely affected by pronounced changes in the direction of flow as by movement past crevices or dead corners which tend to stagnate the flow of materials at such areas causing them to harden and tends to cause degradation in the material and adversely affects the end product. Through applicant's invention, there is a significant improvement in the unobstructed flow for the extrudate from the extruder through the adapter to the plural die heads. This is accomplished by having the respective conduits of the mating adapters and its associated parts with the die heads being circles presenting a perfect sealing between joints and surfaces. With the use of such adapters, the overall weight is reduced in the ratio of 3 to 1 in the case of small adapters and in ratio of 5 to 1 in the case of larger adapters thereby making it easier to handle and change as well as to facilitate the efficient dissipation of heat.

SUMMARY OF THE INVENTION

The present invention contemplates an adapter apparatus having an adapter block that splits the single flow channel from an extruder into at least a pair of separate flow channels. The adapter block is connected to die means via gooseneck. All of the openings between the extruder, adapter block, adapter means or gooseneck and the die heads are circle to circle connections to provide perfect sealing surfaces at all joints to eliminate dead corners at such junctures.

BRIEF DESCRIPTION OF THE INVENTION

DETAILED DESCRIPTION

Figure 1:
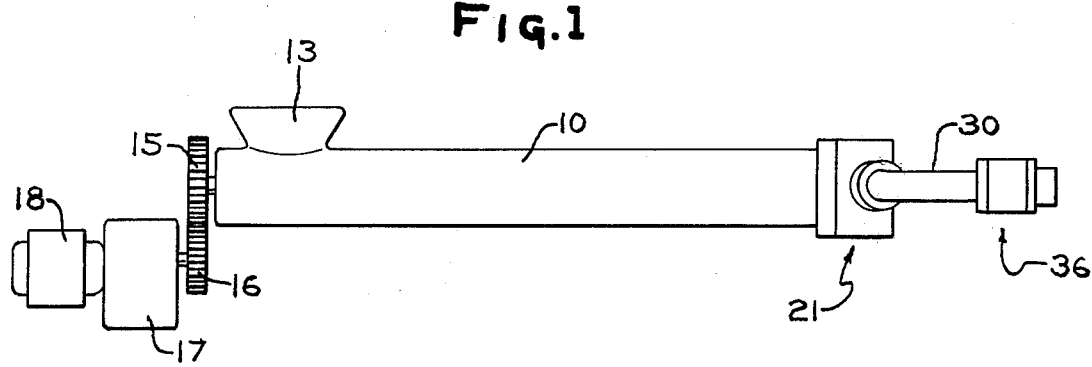
FIG. 1 is a schematic side elevational view of an extruder with adapter and die head.
Figure 2:
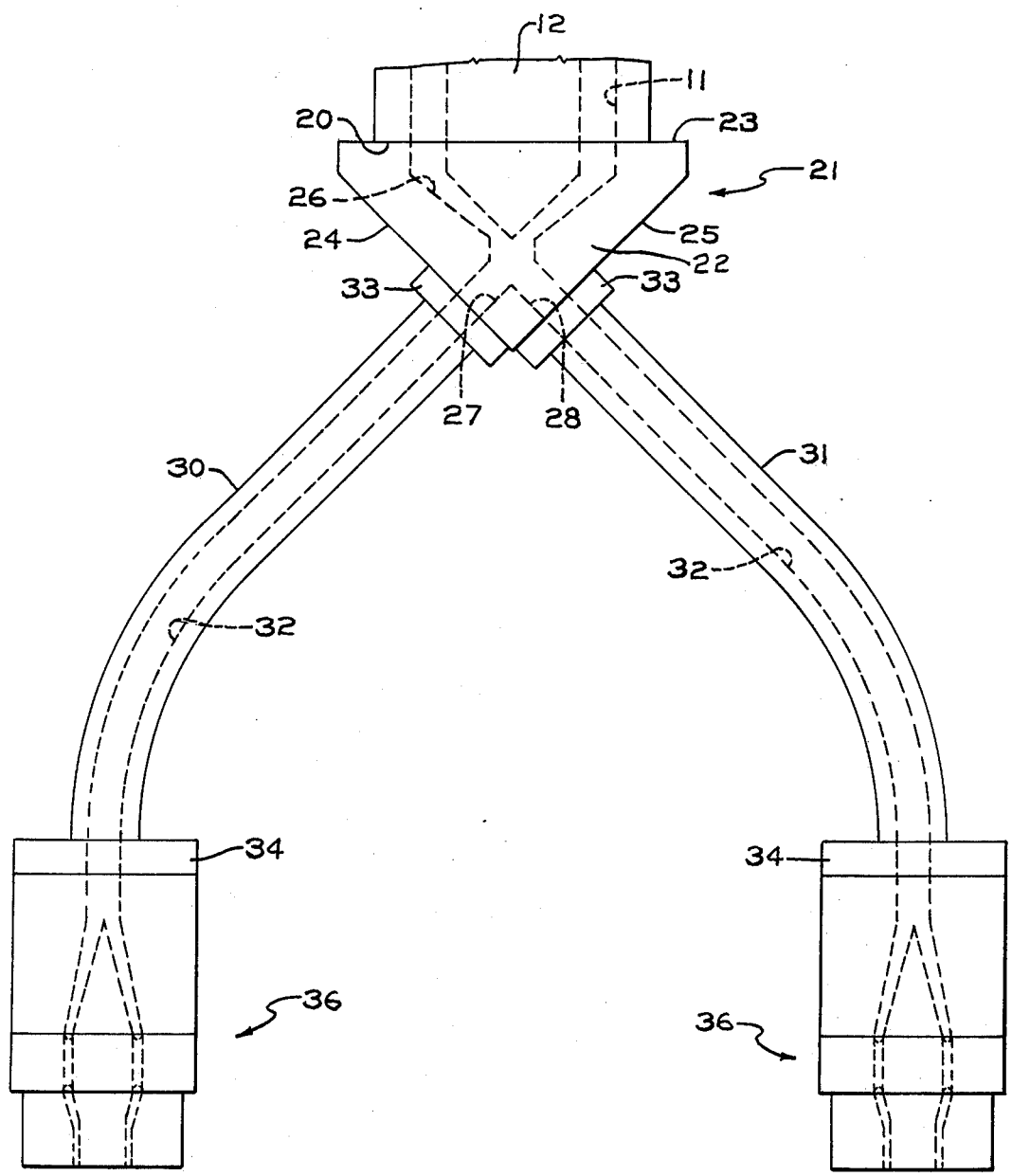
FIG. 2 is a plan view of the extruder, adapter and die head.

Referring to the drawings wherein like reference characters designate like or corresponding parts throughout several views, there is shown in FIG. 1 an extruder which includes a casing 10 suitably mounted on a base not shown. Casing 10 has a longitudinally extending bore co-axial with an opening 11 on the one end thereof to provide communication with the passageway of an adapter apparatus to be described. An extruder screw 12 of suitable design is closely received by the bore of the extruder for plasticizing material therein. A feed hopper 13 is operatively connected to the bore of the extruder to supply thermoplastic material thereto. The one end of the extruder screw 12 is suitably keyed to a gear 15 which meshes with a spur gear 16 that receives its input from transmission means 17 which in turn is connected to motor 18. The one end of the extruder has a planar annular surface 20 which is adapted to abuttingly engage the adapter apparatus 21. The opening 11 makes a circle on the planar surface 20. The adapter apparatus 21 is a one piece adapter block 22 which has a first planar surface 23 which abuttingly engages the planar surface 20 of the extruder. The adapter block 22 has a pair of coverging planar surfaces 24 and 25 which in the example shown form an acute angle relative to each other. A first bore 26 extends into the adapter block 21 forming a perfect circle with the first planar surface 23 and mating with the circle that opening 11 makes with the planar surface 20. A pair of diverging passageways 27 and 28 extend from the junction with passageway 26 outwardly to form a perfect circle with respective planar surfaces 24 and 25. Connected to respective planar surfaces 24 and 25 are adapter means or goosenecks 30 and 31. Goosenecks 30 and 31 are constructed or molded as a linearly extending pipe that is curved sufficiently to provide a non-linear pipe without distorting the central passageway 32 therein so that cylindrical cross-sectioned extrudes passing therethrough passes un-interrupted, thereby providing a conduit means that facilitates the flow of melt therealong. Each gooseneck has a flange 33 and 34 at the respective end portions thereof to provide means for connecting them to the adapter block and their respective die means. Such passageways 32 form a circle on their respective end flanges. The flanges 33 and 34 have planar outer surfaces which form an annular planar surface for connection to the respective planar surfaces 24 and 25 of the adapter block 21 with the circles of the passageways 32 aligning with the respective passageways 27 and 28 of the adaptor block 21. The respective flanges 33 and 34 of goosenecks 30 and 31 are suitably connected to die means 36 for shaping the extrudate to the desired configuration or form. The die means indicated as 36 includes a spider which contours the cylindrical melt into an annular extrudate.

In the operation of the apparatus described, the material to be plasticized is fed into the extruder via hopper 13 and after being worked is extruded therefrom through opening 11 into bore 26 of adapter block 21. The melt is split into two portions for passage via passageways 27 and 28 in goosenecks or adapter means 30 and 31 to the spider portion of die means 36 for shaping into annular forms. The melt is then extruded from the die means 36. The respective mating bores and passageways of the extruder, adapter block, adapter means and die means are all perfect circles to eliminate crevices and assure a smooth mating of the parts. In addition, with the adapter means or gooseneck 30 and 31 being of slender construction, makes the adapter apparatus very compact and light providing excellent dissipation of heat.

Various modifications are contemplated and may obviously be resorted to by those skilled in the art without departing from the described invention, as hereinafter defined by the appended claims, as only a preferred embodiment thereof has been disclosed.

What is claimed is:

1. In combination with an extruder, an adapter apparatus for splitting an extrudate from said extruder as a single extrudate into at least a pair of separate extrudates comprising non-sectioned single piece adapter block attached to said extruder having a first planar surface, said first planar surface having an inlet opening for abutting connection to extruder for said opening receiving melt therefrom, said block having at least two non-coplanar surfaces, an outlet opening in each of said non-coplanar surfaces with said outlet opening used for directing extrudate therefrom, a single passageway extending from said inlet opening into said block, at least a pair of passageways interconnecting said outlet openings with said single passageway, and all of said openings being circles.

2. An adapter as set forth in claim 1 wherein each of said two non-coplanar surfaces have adapter means connected thereto, each of said adapter means has a pair of spaced planar surfaces, a bore extending through each of said adapter means, each of said bores making a circle opening at the respective spaced planar surfaces of their respective adapter means, and die means connected to each of said adapter means.

3. An adapter as set forth in claim 2 wherein said adapter means is an elongated gooseneck.

4. An adapter as set forth in claim 3 wherein said bores are continuous non-linear bores having smooth walls.

5. In combination with an extruder, an adapter apparatus which splits a single extrudate into a plurality of extrudates comprising a one piece adapter block having a first planar surface for abutting said extruder, a bore in said block extending from the interior thereof outwardly intersecting said first planar surface in a circle, said block having a pair of non-coplanar surfaces spaced from said planar surface, the extension of said non-coplanar surfaces intersect to define an acute angle therebetween, a first passageway means extending from a juncture with said bore outwardly to intersect one of said pair of planar surfaces in a circle forming an outlet opening, a second passageway means communicating with said juncture and extending outwardly to intersect the other of said pair of planar surfaces in a circle to form an outlet opening, and each of said outlet opening being connected via conduit means to die means for forming separate extrudates.

6. An adapter as set forth in claim 5 wherein each of said conduit means includes a curved pipe with passageways therethrough and end flanges thereon presenting annular surfaces, one of said annular surfaces of each pipe abuttingly engaging one of said planar surfaces of said pair of planar surfaces to provide circles between mating bores and said passageways, die means with bores therethrough, and said die means connected to the remaining ones of said annular surfaces to provide a circle mating of said passageways of said pipe with said bores of said die means.

* * * * *

UNITED STATES PATENT AND TRADEMARK OFFICE
CERTIFICATE OF CORRECTION

PATENT NO. : 4,032,279
DATED : June 28, 1977
INVENTOR(S) : Heung Tai Kim

It is certified that error appears in the above-identified patent and that said Letters Patent are hereby corrected as shown below:

Column 4, line 6, after "said" insert --- first ---.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks